(12) United States Patent
Wang

(10) Patent No.: US 12,535,076 B2
(45) Date of Patent: Jan. 27, 2026

(54) AUTOMATIC VACUUM SEALER

(71) Applicant: Hongyan Wang, Shenzhen (CN)

(72) Inventor: Hongyan Wang, Shenzhen (CN)

( * ) Notice: Subject to any disclaimer, the term of this patent is extended or adjusted under 35 U.S.C. 154(b) by 40 days.

(21) Appl. No.: 18/621,265

(22) Filed: Mar. 29, 2024

(65) Prior Publication Data

US 2024/0328425 A1    Oct. 3, 2024

(30) Foreign Application Priority Data

Mar. 31, 2023   (CN) .......................... 202320685846.8

(51) Int. Cl.
*F04D 17/16*        (2006.01)
(52) U.S. Cl.
CPC .................... *F04D 17/168* (2013.01)
(58) Field of Classification Search
CPC .... H10D 86/60; H10D 86/441; H10D 86/481; G09G 3/3677; G02F 1/13452; G02F 1/13454; G02F 1/136286; G02F 1/1368
See application file for complete search history.

(56) References Cited

U.S. PATENT DOCUMENTS

| | | | | |
|---|---|---|---|---|
| 5,807,075 A | * | 9/1998 | Jacobsen | A61M 5/142 417/313 |
| 6,814,547 B2 | * | 11/2004 | Childers | H05B 1/025 210/321.71 |
| 12,338,020 B1 | * | 6/2025 | Liu | B65D 81/2038 |
| 2003/0138329 A1 | * | 7/2003 | Koyano | G08B 21/14 417/63 |
| 2016/0101884 A1 | * | 4/2016 | Picozza | B65B 31/047 53/79 |

\* cited by examiner

*Primary Examiner* — Hoang M Nguyen

(57) ABSTRACT

An automatic vacuum sealer includes an upper shell, a lower shell, a circuit board, a vacuum pump, and a battery, where the upper shell and the lower shell are snapped to each other and fixed together; the circuit board, the vacuum pump, and the battery are arranged in an arrangement chamber formed between the upper shell and the lower shell; the vacuum pump and the battery both are connected to the circuit board; the circuit board is further provided with keys configured to control a working state of the vacuum pump; an aspirating port of the vacuum pump communicates with an aspirating hole; and a bottom of the lower shell is provided with a large annular sealing flexible rubber and a small annular sealing flexible rubber. The automatic vacuum sealer is strongly practical and is conducive to promotion and application.

4 Claims, 4 Drawing Sheets

AUTOMATIC VACUUM SEALER

TECHNICAL FIELD

The present disclosure belongs to the technical field of sealers, and in particular relates to an automatic vacuum sealer.

BACKGROUND

Mason bottle is a sealed container that can be used to store food. Due to fresh appearance, rich sizes, and strong plasticity, mason bottles can be used for various purposes. A bottle body and a lid of a mason bottle are separated. Lids of mason bottles can be one-piece lids, two-piece lids, or the like. Currently, threaded lids are adopted for some mason bottles, and these threaded lids can be tightly screwed on bottle bodies for sealing. Although a threaded lid can allow a sealing effect, air in the bottle cannot be discharged, which is not conducive to the long-term storage of a food in the bottle. Alternatively, a manual pump or a hand-held vacuum pump can be used in combination with a sealing lid for vacuuming, or some parts of a product is disassembled to allow vacuuming, which causes troublesome operations.

SUMMARY

In view of the defects in the prior art, the present disclosure provides an automatic vacuum sealer. With the automatic vacuum sealer, a lid can be sealed at a mouth of a bottle through vacuuming. With two flexible rubbers inside the automatic vacuum sealer, wide-mouth and standard-mouth bottles, two common sizes of bottles, can be universally sealed without disassembling and reassembling a product. The automatic vacuum sealer can also be used in combination with an external evacuation accessory, and a plug can be inserted into a sealing lid to allow vacuuming for other products, such as vacuum bags, vacuum boxes, and vacuum tanks. The automatic vacuum sealer is strongly practical and is conducive to promotion and application.

The automatic vacuum sealer of the present disclosure includes an upper shell, a lower shell, a circuit board, a vacuum pump, and a battery, where the upper shell and the lower shell are snapped to each other and fixed together; the circuit board, the vacuum pump, and the battery are arranged in an arrangement chamber formed between the upper shell and the lower shell; the vacuum pump and the battery both are connected to the circuit board; the circuit board is further provided with keys configured to control a working state of the vacuum pump; a middle part of the lower shell is provided with an aspirating hole that communicates up and down, and an aspirating port of the vacuum pump communicates with the aspirating hole; a bottom of the lower shell is provided with a large annular sealing flexible rubber and a small annular sealing flexible rubber; and the two annular sealing flexible rubbers are distributed in a tower shape. The tower-shaped distribution means that the sealing flexible rubbers are staggered sequentially from small to large, such that a position of the sealing flexible rubber with a large diameter is lower than a position of the sealing flexible rubber with a small diameter, which can avoid the interference between the small sealing flexible rubber and a lid of a bottle. With the two sealing flexible rubbers inside the automatic vacuum sealer, wide-mouth and standard-mouth bottles, two common sizes of bottles, can be universally sealed without disassembling and reassembling a product. In use, a lid and a mouth of a bottle are arranged at a bottom of the lower shell, the vacuum pump is controlled by the keys to automatically vacuum the bottle, and after a work is completed, the vacuuming is automatically stopped. After the vacuuming, the lid is tightly pressed on the mouth of the bottle under an action of the atmospheric pressure, thereby allowing sealing. The automatic vacuum sealer can also be used in combination with an external evacuation accessory, and a plug can be inserted into a sealing lid to allow vacuuming for other products, such as vacuum bags, vacuum boxes, and vacuum tanks. The automatic vacuum sealer is strongly practical and is conducive to promotion and application.

Further, a periphery of the bottom of the lower shell is provided with a skirt structure, and the two annular sealing flexible rubbers are arranged at an inner side of the skirt structure to form an integrated structure. In the prior art, in some cases, a hand pump or an electric pump is used in combination with a sealing lid to allow sealing. The integrated structure refers to integration compared with the prior art.

Further, the keys include a power key and a function key, the circuit board is fastened to an inner side of the upper shell through screws, and the power key and the function key are exposed from a top surface of the upper shell. The circuit board is provided with a chip, and the chip is manufactured by the Nyquest Technology Co. Ltd., with a model of NY8A053E SOP14. The circuit board is further provided with a red/blue double-color indicator, and has a design for protecting the battery from overcharge and overdischarge. The battery is a lithium battery with a model of 16580, and is at 1,200 mA and 3.7 V. When a voltage of the battery is insufficient, a red light flashes, prompting to charge. The red light is always on when the battery is charged, and is off when the battery is full. The charging is conducted at 5V1A. Control principles are as follows:

(1) The power key is long pressed for 2 s to turn on a power supply, and a blue light is on. Then a function key is pressed such that the vacuum pump is powered on to work for 22 s, and then the vacuum pump is powered off. A step surface for pressing a lid is provided at an inner side of the sealing flexible rubber, such that a lid can be tightly attached to a mouth of a bottle under a pressure of the sealing flexible rubber. After the vacuum pump is powered off, the inner side of the skirt structure of the lower shell returns to a normal atmospheric pressure, such that a lid is sealed at a mouth of a bottle under an action of the atmospheric pressure, the indicator turns red, and a work is completed. (2) The function key can be pressed once again to repeat a work. (3) The power key can be pressed once again for shutdown.

Further, a top surface of the lower shell and the inner side of the upper shell each are provided with a positioning column configured to clamp and position the vacuum pump and the battery, and an end of the positioning column is provided with a groove matching a surface profile shape of the corresponding vacuum pump or battery. The lower shell is fixedly connected to the upper shell through screws penetrating from bottom to top, and after fastening, the vacuum pump and the battery are clamped and positioned by the positioning columns on the upper shell and the lower shell, resulting in a simple and compact structure.

Beneficial effects of the present disclosure: With the automatic vacuum sealer of the present disclosure, a lid can be sealed at a mouth of a bottle through vacuuming. With the two sealing flexible rubbers inside the automatic vacuum sealer, wide-mouth and standard-mouth bottles, two common sizes of bottles, can be universally sealed without disassembling and reassembling a product. The automatic vacuum sealer can also be used in combination with an external evacuation accessory, and a plug can be inserted into a sealing lid to allow vacuuming for other products, such as vacuum bags, vacuum boxes, and vacuum tanks. The automatic vacuum sealer is strongly practical and is conducive to promotion and application.

BRIEF DESCRIPTION OF THE DRAWINGS

In order to illustrate the specific embodiments of the present disclosure or the technical solutions in the prior art clearly, accompanying drawings required for the description of the specific embodiments or the prior art will be briefly described below. In the accompanying drawings, similar elements or portions are generally identified by similar reference numerals. In the accompanying drawings, each element or portion is not necessarily drawn to an actual scale.

DETAILED DESCRIPTION OF THE EMBODIMENTS

The embodiments of the technical solutions of the present disclosure will be described in detail below with reference to the accompanying drawings. The following embodiments are used merely to clearly illustrate the technical solutions of the present disclosure. Therefore, these embodiments are merely exemplary and are not intended to limit the protection scope of the present disclosure.

It should be noted that the technical terms or scientific terms used in the present application should have the ordinary meanings as understood by those skilled in the art to which the present disclosure belongs, unless otherwise stated.

Figure 1:
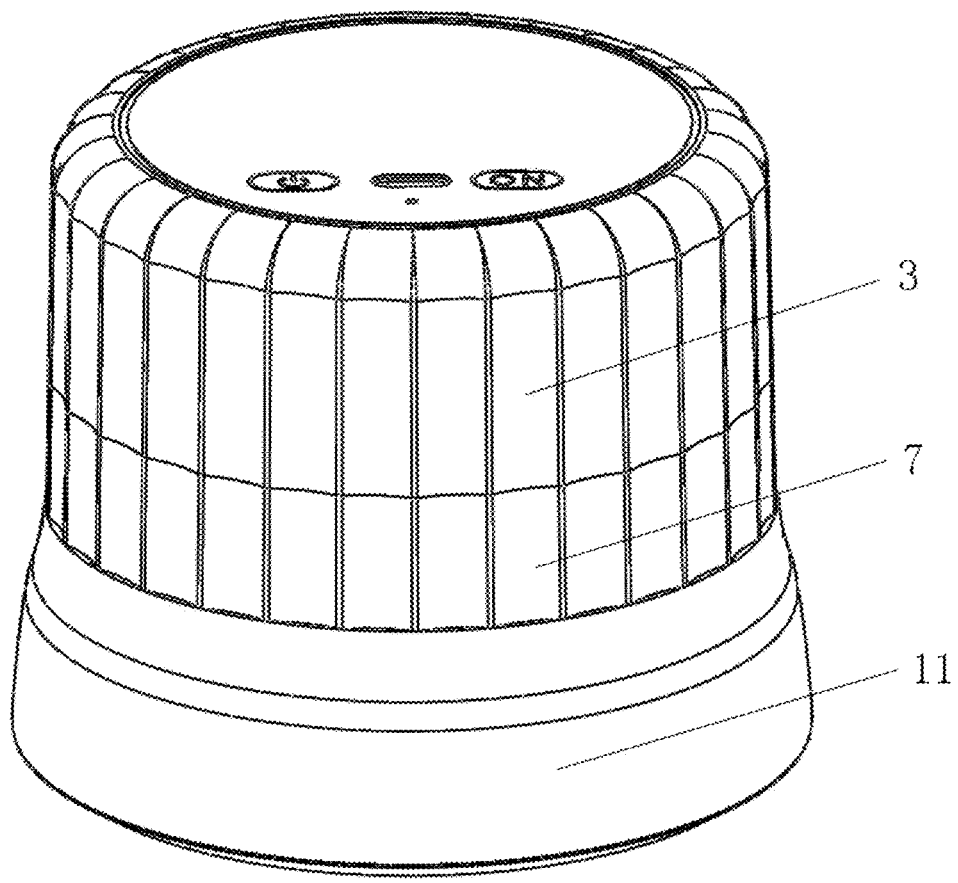
FIG. 1 is a schematic structural diagram of the present disclosure.
Figure 2:
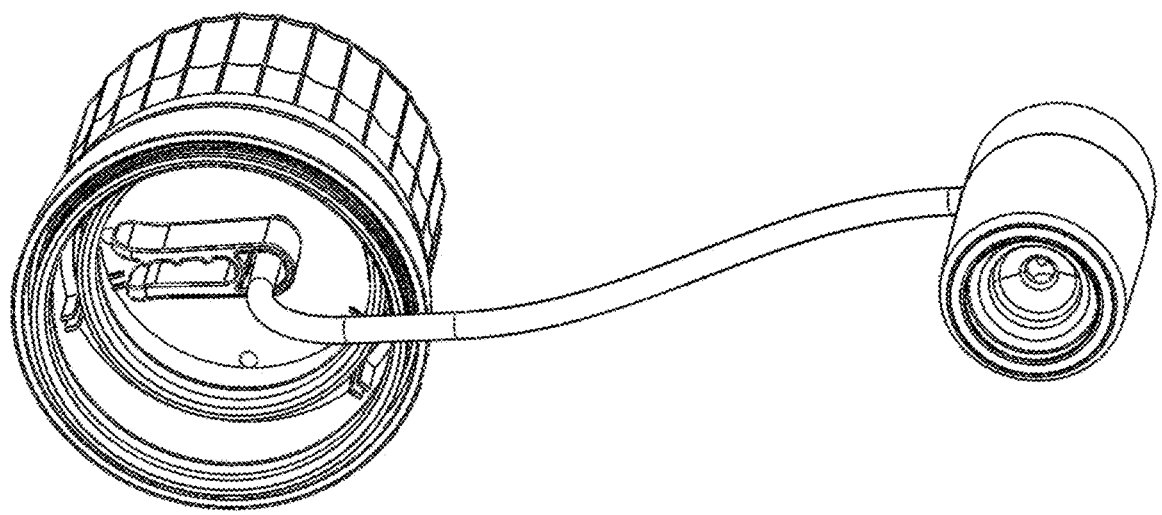
FIG. 2 is a schematic structural diagram of a connection of the present disclosure to an external evacuation accessory.
Figure 3:
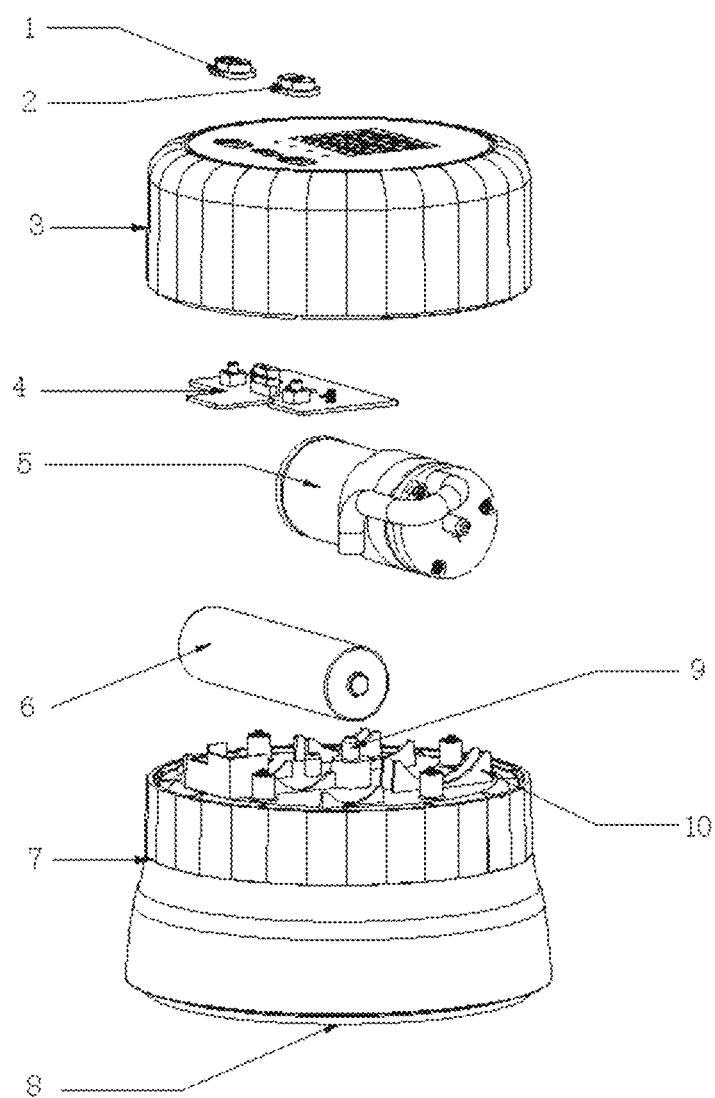
FIG. 3 is an exploded view of the present disclosure.
Figure 4:
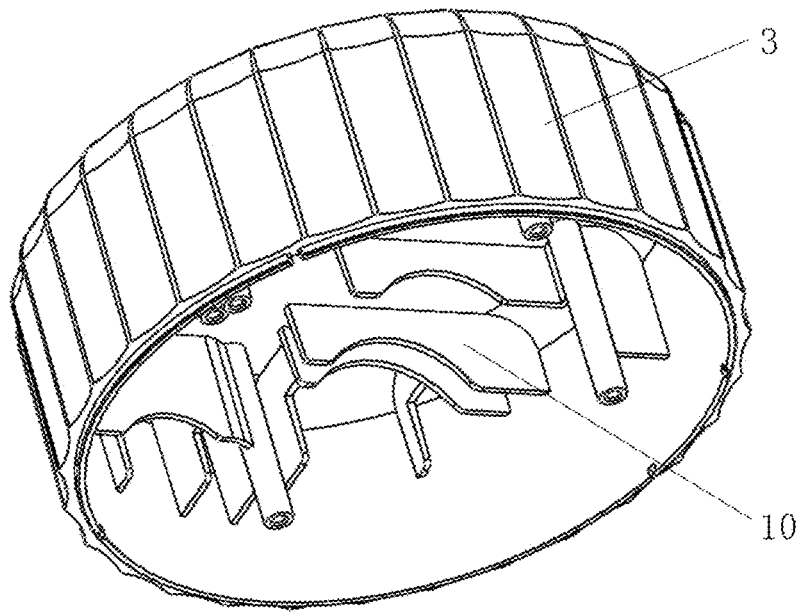
FIG. 4 is a stereoscopic view of an upper shell.
Figure 5:
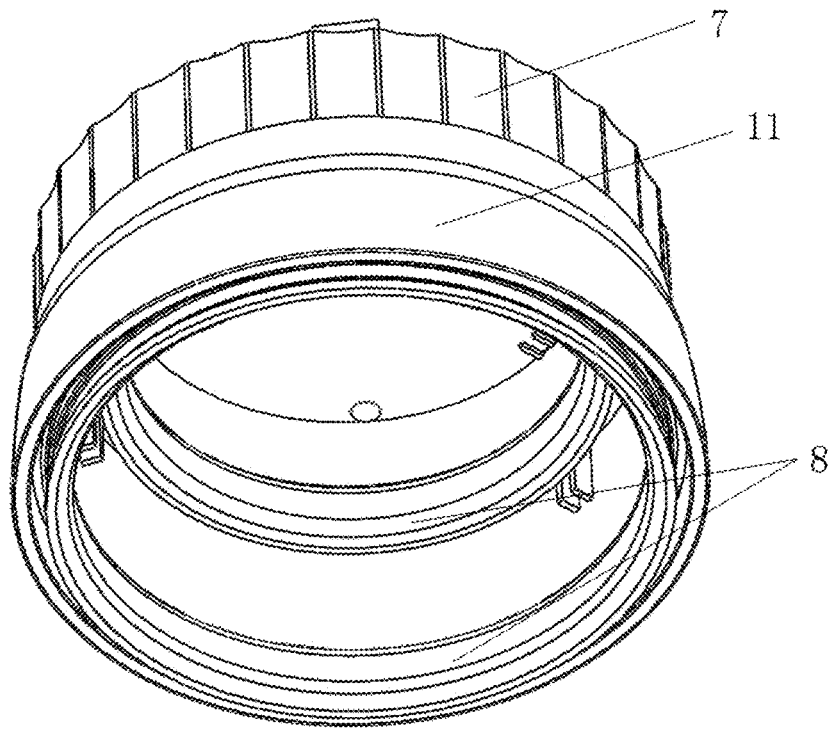
FIG. 5 is a stereoscopic diagram of a lower shell.
Figure 6:
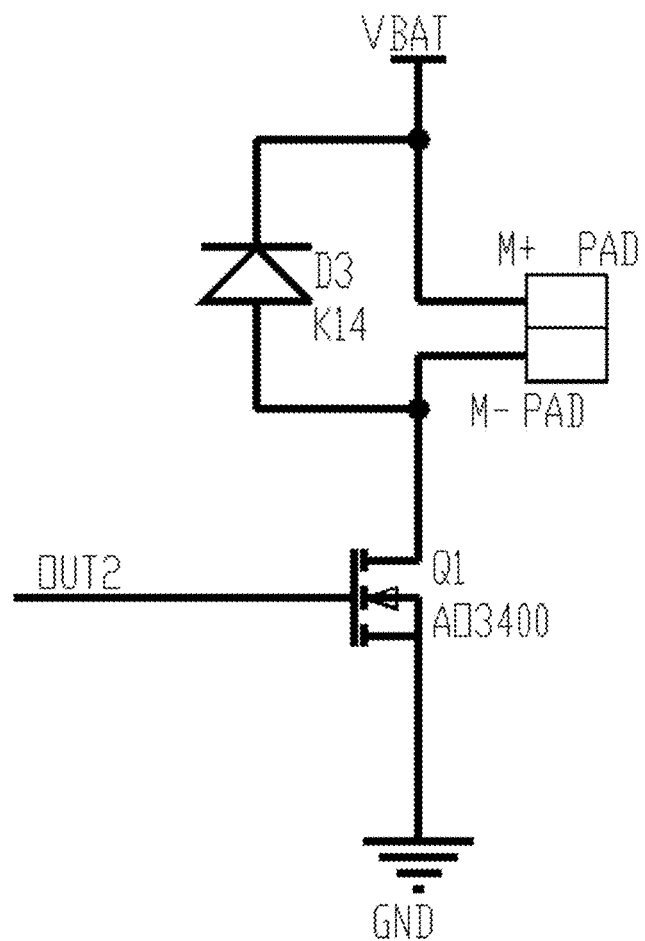
FIG. 6 is a schematic diagram of a circuit theory.

As shown in FIG. 1 to FIG. 6, the automatic vacuum sealer in this embodiment includes an upper shell 3, a lower shell 7, a circuit board 4, a vacuum pump 5, and a battery 6, where the upper shell 3 and the lower shell 7 are snapped to each other and fixed together; the circuit board 4, the vacuum pump 5, and the battery 6 are arranged in an arrangement chamber formed between the upper shell 3 and the lower shell 7; the vacuum pump 5 and the battery 6 both are connected to the circuit board 4; the circuit board 4 is further provided with keys configured to control a working state of the vacuum pump 5; a middle part of the lower shell 7 is provided with an aspirating hole 9 that communicates up and down, and an aspirating port of the vacuum pump 5 communicates with the aspirating hole 9; a bottom of the lower shell 7 is provided with a large annular sealing flexible rubber 8 and a small annular sealing flexible rubber 8; and the two annular sealing flexible rubbers 8 are distributed in a tower shape. The tower-shaped distribution means that the sealing flexible rubbers 8 are staggered sequentially from small to large, such that a position of the sealing flexible rubber 8 with a large diameter is lower than a position of the sealing flexible rubber 8 with a small diameter, which can avoid the interference between the small sealing flexible rubber 8 and a lid of a bottle. With the two sealing flexible rubbers 8 inside the automatic vacuum sealer, wide-mouth and standard-mouth bottles, two common sizes of bottles, can be universally sealed without disassembling and reassembling a product. In use, a lid and a mouth of a bottle are arranged at a bottom of the lower shell 7, the vacuum pump 5 is controlled by the keys to automatically vacuum the bottle, and after a work is completed, the vacuuming is automatically stopped. After the vacuuming, the lid is tightly pressed on the mouth of the bottle under an action of the atmospheric pressure, thereby allowing sealing. The automatic vacuum sealer can also be used in combination with an external evacuation accessory, and a plug can be inserted into a sealing lid to allow vacuuming for other products, such as vacuum bags, vacuum boxes, and vacuum tanks. The automatic vacuum sealer is strongly practical and is conducive to promotion and application.

In this embodiment, a periphery of the bottom of the lower shell 7 is provided with a skirt structure 11, and the two annular sealing flexible rubbers 8 are arranged at an inner side of the skirt structure 11 to form an integrated structure. In the prior art, in some cases, a hand pump or an electric pump is used in combination with a sealing lid to allow sealing. The integrated structure refers to integration compared with the prior art.

In this embodiment, the keys include a power key 2 and a function key 1, the circuit board 4 is fastened to an inner side of the upper shell 3 through screws, and the power key 2 and the function key 1 are exposed from a top surface of the upper shell 3. The circuit board 4 is provided with a chip, and the chip is manufactured by the Nyquest Technology Co. Ltd., with a model of NY8A053E SOP14. The circuit board 4 is further provided with a red/blue double-color indicator, and has a design for protecting the battery 6 from overcharge and overdischarge. The battery 6 is a lithium battery 6 with a model of 16580, and is at 1,200 mA and 3.7 v. When a voltage of the battery 6 is insufficient, a red light flashes, prompting to charge. The red light is always on when the battery is charged, and is off when the battery is full. The charging is conducted at 5v1A. Control principles are as follows: (1) The power key is long pressed for 22 s to turn on a power supply, and a blue light is on. Then the function key 1 is pressed such that the vacuum pump 5 is powered on to work for 22 s, and then the vacuum pump 5 is powered off. A step surface for pressing a lid is provided at an inner side of the sealing flexible rubber 8, such that a lid can be tightly attached to a mouth of a bottle under a pressure of the sealing flexible rubber 8. After the vacuum pump 5 is powered off, the inner side of the skirt structure 11 of the lower shell 7 returns to a normal atmospheric pressure, such that a lid is sealed at a mouth of a bottle under an action of the atmospheric pressure, the indicator turns red, and a work is completed. (2) The function key 1 can be pressed once again to repeat a work. (3) The power key 2 can be pressed once again for shutdown.

In this embodiment, a top surface of the lower shell 7 and the inner side of the upper shell 3 each are provided with a positioning column 10 configured to clamp and position the vacuum pump 5 and the battery 6, and an end of the positioning column 10 is provided with a groove matching a surface profile shape of the corresponding vacuum pump 5 or battery 6. The lower shell 7 is fixedly connected to the upper shell 3 through screws penetrating from bottom to top, and after fastening, the vacuum pump 5 and the battery 6 are clamped and positioned by the positioning columns 10 on the upper shell 3 and the lower shell 7, resulting in a simple and compact structure.

Finally, it should be noted that the above embodiments are provided merely for describing the technical solutions of the present disclosure, but not for limiting the present disclosure. Although the present disclosure is described in detail with reference to the above embodiments, a person of ordinary skill in the art should understand that they may still make modifications to the technical solutions described in the above embodiments or make equivalent replacements to some or all technical features thereof, and these modifications or replacements do not make the essence of the corresponding technical solution depart from the scope of the technical solutions of the embodiments of the present disclosure, and shall fall within the scope of claims and specification of the present disclosure.

What is claimed is:

1. An automatic vacuum sealer, comprising an upper shell, a lower shell, a circuit board, a vacuum pump, and a battery, wherein the upper shell and the lower shell are snapped to each other and fixed together; the circuit board, the vacuum pump, and the battery are arranged in an arrangement chamber formed between the upper shell and the lower shell; the vacuum pump and the battery both are connected to the circuit board; the circuit board is further provided with keys configured to control a working state of the vacuum pump; a middle part of the lower shell is provided with an aspirating hole that communicates up and down, and an aspirating port of the vacuum pump communicates with the aspirating hole; a bottom of the lower shell is provided with a large annular sealing flexible rubber and a small annular sealing flexible rubber; and the two annular sealing flexible rubbers are distributed in a tower shape.

2. The automatic vacuum sealer according to claim 1, wherein a periphery of the bottom of the lower shell is provided with a skirt structure, and the two annular sealing flexible rubbers are arranged at an inner side of the skirt structure to form an integrated structure.

3. The automatic vacuum sealer according to claim 2, wherein the keys comprise a power key and a function key, the circuit board is fastened to an inner side of the upper shell through screws, and the power key and the function key are exposed from a top surface of the upper shell.

4. The automatic vacuum sealer according to claim 3, wherein a top surface of the lower shell and the inner side of the upper shell each are provided with a positioning column configured to clamp and position the vacuum pump and the battery, and an end of the positioning column is provided with a groove matching a surface profile shape of the corresponding vacuum pump or battery.

\* \* \* \* \*